A. NOLDA.
STRAINER FOR DRINKING VESSELS.
APPLICATION FILED DEC. 31, 1914.
1,174,518.
Patented Mar. 7, 1916.
Fig. 1.
Fig. 2.
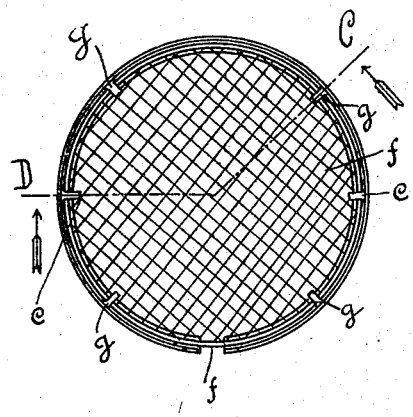
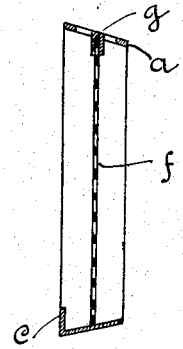
Fig. 3.
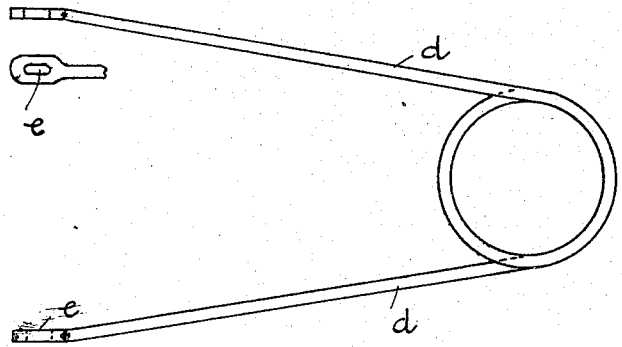
Inventor:
August Nolda
By B. Singer
Atty.

UNITED STATES PATENT OFFICE.

AUGUST NOLDA, OF BERLIN, GERMANY.

STRAINER FOR DRINKING VESSELS.

1,174,518.   Specification of Letters Patent.   Patented Mar. 7, 1916.

Application filed December 31, 1914. Serial No. 879,949.

*To all whom it may concern:*

Be it known that I, AUGUST NOLDA, a subject of the Emperor of Germany, and resident of Berlin, Germany, have invented new and useful Improvements in Strainers for Drinking Vessels, of which the following is a specification.

The object of the present invention is a strainer for drinking vessels for preventing solid particles contained in the liquid, as for instance ice, part of foods, seeds or the like from getting into the mouth of the drinker.

The most essential and important feature of the invention resides in the fact that the same strainer may be used with a plurality of smooth walled vessels of different sizes and with this end in view the strainer or sieve proper is housed within a slit, and therefore resilient casing, the outside of which is preferably conically shaped in order to fit smoothly against the inner wall of a vessel.

In the drawing:—Figure 1 is a plan view of a strainer of sieve-like construction. Fig. 2 is a section on line C—D of Fig. 1, seen in the direction of the arrows. Fig. 3 shows the device for inserting and removing the strainer.

As shown the resilient ring $a$ is provided with a sieve $f$ which is preferably secured at several points of its periphery by means of flaps $g$ which are stamped out of the material of the ring $a$. It is evident that the sieve $f$ must be of a diameter less than that of the ring $a$ to permit the compression of the same when the strainer is to be used with smaller vessels. In this form of construction the ring $a$ is preferably also equipped with lugs $c$ serving as points of engagement for the prongs $d$.

What I claim is:—

1. In a strainer for drinking vessels, a slitted ring encircling the strainer adapted to fit smoothly against the inner wall of the vessel, and lugs on said ring adapted to be engaged by a tool for removing said ring or for inserting the same into said strainer.

2. In a strainer for drinking vessels, a slitted ring encircling the strainer and having a conically shaped outer surface, adapted to accommodate itself automatically and snugly to the shape of the vessel, and lugs on said ring adapted to be engaged by a tool for inserting and removing said ring from said strainer.

3. In a strainer for drinking vessels, the combination of a slitted resilient ring with a strainer constituted by an ordinary sieve, said ring being adapted to encircle and to hold said sieve in position within the vessel and to accommodate itself automatically to the shape of the vessel and to fit closely against the inner wall of the same, and lugs on said ring adapted to be engaged by a tool for inserting and removing said ring from said sieve.

In testimony whereof I have signed my name to this specification in the presence of two subscribing witnesses.

AUGUST NOLDA.

Witnesses:
 HANAH AMMIN,
 ADELE LARHMANN.

Copies of this patent may be obtained for five cents each, by addressing the "Commissioner of Patents, Washington, D. C."